(12) United States Patent
Frouin et al.

(10) Patent No.: US 8,913,183 B2
(45) Date of Patent: Dec. 16, 2014

(54) VIDEO PROJECTOR AND ASSOCIATED DATA TRANSMISSION

(71) Applicant: Canon Kabushiki Kaisha, Tokyo (JP)

(72) Inventors: Laurent Frouin, Rennes (FR); Lionel Tocze, Saint Domineuc (FR); Pierre Visa, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/027,746

(22) Filed: Sep. 16, 2013

(65) Prior Publication Data
US 2014/0078399 A1    Mar. 20, 2014

(30) Foreign Application Priority Data
Sep. 17, 2012 (GB) .................................. 1216557.7

(51) Int. Cl.
| | |
|---|---|
| *H04N 5/66* | (2006.01) |
| *H04N 5/04* | (2006.01) |
| *H01Q 25/00* | (2006.01) |
| *H04N 7/20* | (2006.01) |
| *H01Q 21/28* | (2006.01) |
| *G06F 3/14* | (2006.01) |

(52) U.S. Cl.
CPC .............. *H04N 5/04* (2013.01); *H01Q 25/005* (2013.01); *H04N 7/20* (2013.01); *H01Q 21/28* (2013.01); *G06F 3/1446* (2013.01)
USPC ............. 348/383; 348/645; 348/806; 353/30; 353/94; 345/1.1; 345/1.2; 345/1.3; 345/2.1; 345/2.3

(58) Field of Classification Search
CPC ................................. G03B 21/26; H04N 9/12
USPC ............................................. 348/383; 353/94
See application file for complete search history.

(56) References Cited

U.S. PATENT DOCUMENTS

| | | | |
|---|---|---|---|
| 7,061,476 B2 | 6/2006 | Fujiwara et al. | |
| 7,164,933 B1* | 1/2007 | Steigerwald et al. | 455/562.1 |
| 2004/0217948 A1 | 11/2004 | Kawasaki et al. | |
| 2005/0146470 A1 | 7/2005 | Li et al. | |
| 2005/0176462 A1* | 8/2005 | Kawasaki | 455/552.1 |
| 2008/0037466 A1* | 2/2008 | Ngo et al. | 370/329 |
| 2008/0100805 A1 | 5/2008 | Majumder et al. | |
| 2008/0180342 A1* | 7/2008 | Kerselaers | 343/795 |
| 2008/0304433 A1 | 12/2008 | Lida et al. | |
| 2009/0122201 A1* | 5/2009 | Freundlich et al. | 348/725 |

(Continued)

FOREIGN PATENT DOCUMENTS

| | | |
|---|---|---|
| EP | 1244303 A2 | 9/2002 |
| JP | 2008216805 A | 9/2008 |
| WO | 95/31070 A2 | 11/1995 |

*Primary Examiner* — Jefferey Harold
*Assistant Examiner* — Humam Satti
(74) *Attorney, Agent, or Firm* — Canon USA Inc. IP Division

(57) ABSTRACT

A video projector, a cluster of video projectors and a method for wirelessly transmitting image data within the cluster of video projectors. The video projector includes a first antenna located at a first side of the projector and a second antenna located at a second side of the projector, opposite to the first side. Image data is divided into sub-parts, and distributed by assigning each image data sub-part to a video projector. A video projector receiving image data sub-parts extracts and stores the image data sub-part assigned to it, and retransmits image data sub-parts assigned to respectively a second and third video projectors.

23 Claims, 12 Drawing Sheets

(56) References Cited

U.S. PATENT DOCUMENTS

| | | |
|---|---|---|
| 2009/0160731 A1 | 6/2009 | Schuler et al. |
| 2010/0045594 A1 | 2/2010 | Jenks et al. |
| 2010/0182234 A1* | 7/2010 | Takahashi et al. ............ 345/157 |
| 2010/0265161 A1* | 10/2010 | Harrysson et al. ............ 345/2.3 |
| 2011/0096757 A1* | 4/2011 | Abramov et al. ............. 370/338 |
| 2013/0031441 A1* | 1/2013 | Ngo et al. ..................... 714/758 |
| 2013/0057591 A1* | 3/2013 | Sugiyama ..................... 345/671 |
| 2013/0169499 A1* | 7/2013 | Lin et al. ....................... 343/776 |
| 2013/0172034 A1* | 7/2013 | Kubota ......................... 455/509 |

* cited by examiner

VIDEO PROJECTOR AND ASSOCIATED DATA TRANSMISSION

CROSS-REFERENCE TO RELATED APPLICATIONS

This application claims the benefit under 35 U.S.C. §119 (a)-(d) of United Kingdom Patent Application No. 1216557.7, filed on Sep. 17, 2012 and entitled "A method and device for encoding and decoding a video signal".

The above cited patent application is incorporated herein by reference in its entirety.

FIELD OF THE INVENTION

The invention relates to the field of multiple projectors system, and in particular to the field of video distribution to a plurality of video projectors forming a cluster of video projectors.

The invention relates to a device, a system and a method for distributing an image to the video projectors (VP) of a multi projection (MP) system.

The abbreviations VP, standing for Video Projector, and MP, standing for Multi Projection system, will be employed in the following description.

BACKGROUND OF THE INVENTION

Multi projection (MP) systems are attracting attention to provide very high precision and high quality image on large display area. Such MP system might be employed for large projection areas like dome, stadium and concert hall or for projection on building.

Each single video projector (VP) of a MP system generates an image with a definition and a size determined by the VP lens focal length, the size of the VP's light modulation device (e.g. a LCD panel) and the distance between the VP and the screen or display zone. Covering a large projection screen with a sufficient definition and brightness usually requires aggregating several VPs in a manner that they cover adjacent, partially overlapping zones of the total screen area. In the overlapping zones, blending ensures a smooth transition among different VPs so as to be tolerant against small displacements introduced e.g. by vibrations or thermal expansion. VPs are commonly equipped with zoom lenses (i.e. lenses with variable focal length) to provide the user some freedom when installing the VP, as for example for adapting to the distance between the VP and the screen.

Usually a MP system includes a wired communication network to distribute video image data from a video source device to the VPs. The video image is distributed to the VPs through the wired communication network. Such a MP system is illustrated in US2008100805 which discloses an asynchronous, distributed, and calibrated apparatus providing a composite display from a plurality of plug-and-play projectors. The apparatus comprises a plurality of self-sufficient modules. Each module comprises a plug-and-play projector. A camera is coupled to each projector. A software or firmware controlled, computation and communication circuit is coupled to the projector and executes a single-program-multiple-data (SPMD) calibration algorithm that simultaneously runs on each self-sufficient module to generate a scalable and reconfigurable composite display without any need for user input or a central server.

The drawback of such system is that it sometimes requires long and costly cables to connect the video source to each VP. For very long distances, some repeaters shall be added to guarantee correct signals shape at VP input connector. Also especially for outdoor installation, it may be difficult even impossible to install several cables from the video source to each projector. To mitigate the burden of cabling operation, one solution is to connect the video source to only one video projector and then to interconnect each VP through a daisy chain wired structure. This is illustrated in the U.S. Pat. No. 7,061,476 where an image to be displayed is transferred from the video source to a first VP, and then from first VP to a second VP and so on. Here again specific cabling is required, with potentially long cables if VPs are far from each other.

From the above examples, it appears that wireless connectivity can solve some cabling issue in MP system. As the performance of wireless technology is improving in terms of throughput, it becomes conceivable to wirelessly interconnect VPs within a MP system, even for the transmission of uncompressed video. The advantage of transferring uncompressed video is to benefit from the highest quality as there is no compression, and to provide a very low latency system allowing interactivity with the user (for instance for simulation tool). Transferring uncompressed video requires large bandwidth, in the order of several Gbps (Giga bits per second), but it becomes achievable with most recent wireless technologies like 60 GHz millimeter wave operating in the 57-66 GHz unlicensed spectrum.

60 GHz-based communication systems are widely studied (e.g. IEEE 802.11ad Task Group; IEEE 802.15.3c standard; Wireless HD; WiGig) and the research community proposes several solutions and methods to transport the audio and video applications with a desired quality of service.

In a wireless communication system, connection setup and communication link bandwidth reservation are conducted before transmitting a video stream. Ideally, sufficient link bandwidth can be allocated and the video stream can be transmitted smoothly after stream set-up control.

An approach of wireless VP is illustrated in the publication US20040217948, depicting a 60 GHz millimeter wave connection between a laptop and a single VP. Also the publication US20100045594 describes a system made of several displays connected to a video source and a control device through wireless connections. In this latter system, there are no wireless transmissions of video data between displays; video data are only transmitted by the video source. This solution is not adapted in the case of MP system, as some VPs may be not visible from the video source, or the quality of communications may be poor or subject to masking conditions. Indeed, video source is usually located at the ground level while VPs are typically hanging overhead or to a metallic structure so that there are no obstacles between VPs and the display screen. As a consequence the conditions of wireless communications between VPs are likely to be safe, at least with better robustness than the wireless communication between a VP and a video source. For this reason, it is advantageous to consider transmitting all video data from the video source to one of the VP of the MP system, and then to wirelessly distribute video data from this particular VP to the other VPs.

There are various ways to implement the wireless function according to some dimensioning parameters or constraints. First of all, the video resolution defines the required bandwidth for data transmission. Let's consider a cluster of 4 VPs to display a 3840×2160 pixel uncompressed video source with 60 frames per second and 4:2:0 chrominance sub-sampling (i.e. average of 12 bits per pixel). Taking into account that a video image is split into 4 image sub-parts with, for instance, 20% of overlapping zones for blending function, the VP connected to the video source, also called the master VP, receives all video image sub-parts at a bit rate of 7.16 Gbps.

Then, the master VP shall keep one image sub-part for display and it shall transmit the 3 other image sub-parts to the other projectors. Therefore, the minimum bandwidth required on the wireless medium is 5.37 Gbps (3×1.79 Gbps). Based on specifications of current emerging standards for 60 GHz millimeter wave domain, up to 4 radio channels can be simultaneously used with typical useful throughput of around 3.8 Gbps per radio channel (after demodulation and error correction code). For instance, such figure corresponds to the HRP mode 2 of IEEE 802.15.3c AV mode standard specifications. However this figure shall be lower to around 3.5 Gbps to take into account the overhead due to inter-frame gaps, transmission of preambles and MAC (Medium Access Control) headers. According to the above example, a way to transmit video image sub-parts from one master VP to 3 VPs would be to install three radio modules on master VP operating on 3 different radio channels, and to install one radio module on each other VP which supposes providing three independent point-to-point transmissions. However such a solution would appear costly. Indeed, it would be advantageous to deliver all projectors with identical hardware configuration, letting the user free to install VPs in a MP system or just to benefit from wireless connectivity in a single VP configuration.

A further question is how to place the antenna of each radio module so that VPs can efficiently communicate in different MP system configuration (generally square or rectangular shape). Here, it may be proposed to use smart antennas that allow controlling the direction of antenna radiation pattern. The smart antennas are made of a network of radiating elements distributed in a matrix form on a support. These types of antennas allow the implementation of the technique known as "Beam Forming". According to this technique, each radiating element of the antenna is electronically controlled in phase and power to obtain a directional transmission and/or directional reception beam. As this technique involves additional complexity for control and additional cost for the antenna itself, it is preferable to consider static antenna with a quasi omni-directional radiation pattern. In case of long distance between VPs, then smart antennas providing beam forming technique would be chosen but here again it is advantageous to limit their numbers for cost reason.

A goal of certain aspects of the present invention is to provide a VP with limited hardware cost for the wireless communication means allowing efficient wireless video data distribution within a cluster of VPs forming a MP system.

Another goal of aspects of the invention is to facilitate the set-up of MP system and make it more flexible.

It is another goal of aspects of the invention to restrict the number of occupied radio channels as the number of available radio channels can be limited due to regulations restrictions or to the presence of interference.

A still further goal aspects of is to efficiently and reliably control the image distribution and the image projection timing in a MP system.

SUMMARY OF THE INVENTION

According to an aspect, the present invention provides a video projector including a first antenna located at a first side of the projector and a second antenna located at a second side of the projector, opposite to the first side, wherein the first antenna is configured to form a first radiation pattern that extends outwardly from the first side, the second antenna is configured to form a second radiation pattern that extends outwardly from the second side, and wherein the first and second radiation pattern do not interfere.

Thanks to this position of antenna, a video projector in a multi-projection system can potentially communicate with all other adjacent video projectors. Only two antennas are used to provide this communications capability. For a single wireless video projector usage scenario, this arrangement provides more flexibility for the positioning of the video projector relative to a wireless video source (e.g. a laptop).

In one embodiment each antenna defines a central beam axis and is configured to form a substantially hemi-elliptical radiation pattern centered about this axis. In another embodiment the first and second antennas are arranged with their central beam axes substantially anti-parallel. These embodiments allow limiting interferences between the patterns while enabling communication with adjacent video projectors.

In a particular embodiment the central beam axes are arranged to be substantially perpendicular to an optical axis of the projector. This allows simplifying the installation of a MP system in particular in cases where the VP are located on a grid situated in front of a display zone.

In one other embodiment, the central beam axes are arranged to be inclined with respect to a reference direction of the VP when in use. Advantageously, the reference direction is a reference line joining the antennas and extending from the first side to the second side. These particular features further limit interference risks between the patterns while still enabling communication with adjacent video projectors.

In one further embodiment, the video projector includes a third antenna located at the first side adjacent to the first antenna and a fourth antenna located at the second side adjacent to the second antenna, each third and fourth antenna defining a central beam axis and being configured to form a substantially hemi-shaped radiation pattern centered about this axis, wherein the central beam axes of the third and fourth antennas are arranged to be inclined with respect to the reference direction of the VP when in use. These particular features confer to the VP more communication alternatives while avoiding interference with certain adjacent video projectors.

Further, the inclination of the beam axis of the third and fourth antennas is opposite to the inclination of the beam axis of the first and second antennas with respect to the reference direction allowing to favor communications with certain adjacent video projectors while avoiding interference with others.

Advantageously, the video projector further includes switching means enabling to switch from one antenna to another antenna for selecting the inclination of the beam axes. This feature simplifies setting a reliable communication network within a MP system by selecting the antennas communicating together.

Alternatively, the antennas are steerable in order to control the inclination of the central beam axes with respect to the reference direction.

In a particular embodiment, the video projector includes an electro-magnetic shield disposed inside the video projector such that the first and second radiation patterns do not interfere. The same radio channels can therefore be used to transmit data with both antennas.

The shield can be disposed between the antennas. Advantageously, the shield is constituted by at least one component of the VP which can be constituted by existing electronics parts inside a video projector.

The shield can be disposed adjacent to each antenna. The shield may contain electro-magnetic reflecting and/or absorbing materials.

According to another aspect, the invention provides a wireless cluster of video projectors for the transmission of image data from video projector to video projector, wherein each video projector of the cluster is a video projector previously disclosed, the video projectors being arranged so that the first and second radiation pattern of a first video projector is configured to communicate with, respectively, at least one antenna of a second and one antenna of a third video projector.

Thanks to this arrangement, the first video projector which receives video image sub-parts from the video source is able to simultaneously transmit the image data sub-parts to at least two other video projectors. This enables to aggregate bandwidth provided by two radio modules in order to support high video resolution as 4K2K.

Advantageously, the video projectors are further arranged so that the radiation pattern of an antenna of the second video projector and the radiation pattern of an antenna of the third video projector reaches respectively first and second antennas of a fourth video projector. The fourth VP can than reconstruct the image to be displayed. Thanks to this arrangement, certain video projectors are able to relay image data sub-parts to other video projectors not directly reachable by the first video projector.

In an embodiment, the video projectors are arranged on a grid and the central beam axes defined by the antennas are inclined relative to the grid, which limit interference risks between the patterns while still enabling communication with adjacent video projectors. The grid may be a regular rectangular array for example with VPs located at grid intersections. In this way, the beam axes may be inclined with respect to straight lines joining adjacent projectors of the cluster.

In still another aspect, the invention provides a wireless transmission method for distributing image data within a cluster of video projectors from a first video projector to other video projectors of the cluster, the method including:

dividing the image data into several image data sub-parts;
assigning each image data sub-part to a video projector in accordance to a composite image to be displayed by the cluster;
the method further including at the first video projector:
receiving image data sub-parts;
extracting and storing the image data sub-part assigned to the first video projector; and
retransmitting through the first and second antenna image data sub-parts assigned to respectively the second and third video projectors.

A video projector can thus act as a relay, receiving image data from one antenna associated to a radio module, keeping certain image data to display, and forwarding other image data for other video projectors through its antennas.

In an embodiment the method further includes second and third video projectors:
receiving through the first antenna the image data sub-parts transmitted by the first video projector,
extracting and storing the image data sub-part assigned to the respective video projector; and
retransmitting through the second antenna the image data sub-parts assigned to a fourth video projector.

Thanks to this arrangement, video projectors are able to relay image data sub-parts to other video projectors not directly reachable by the first video projector.

In a particular embodiment the second and a third video projectors receive image data subparts through a first radio channel and retransmit image data subparts on a second radio channel different from the first channel. This avoids interference between the concurrent wireless communications involving two radio modules of the video projector.

In an embodiment the fourth video projector assemble the received image data sub-parts. The last video projector in the transmission chain may thus receive its image data sub-parts from different video projectors and merges data received from the different video projectors to recreate the image data to display.

In an embodiment the method includes, before the step of receiving image data sub-parts, exchanging through the antennas control data relative to the image data sub-parts to be received. This allows each VP to efficiently and reliably control the image distribution and processing within the MP system.

In a particular embodiment the image data are transmitted within frames according to a TDMA sequence, the first VP transmitting control data marking the beginning of the TDMA sequence (also called surperframe), the other VPs determining the beginning of each TDMA sequence according to the reception time of the frames. These features allow to efficiently control the image projection timing in the MP system.

Advantageously, the first VP marks the beginning of the TDMA sequence by transmitting the first frame at the beginning of the TDMA sequence. To do so, the first frame may include a beacon signal.

The invention is also directed to a non-transitory computer-readable medium storing a program and an information storage means readable by a computer or a microprocessor.

DETAILED DESCRIPTION OF THE EMBODIMENTS

Figure 1:
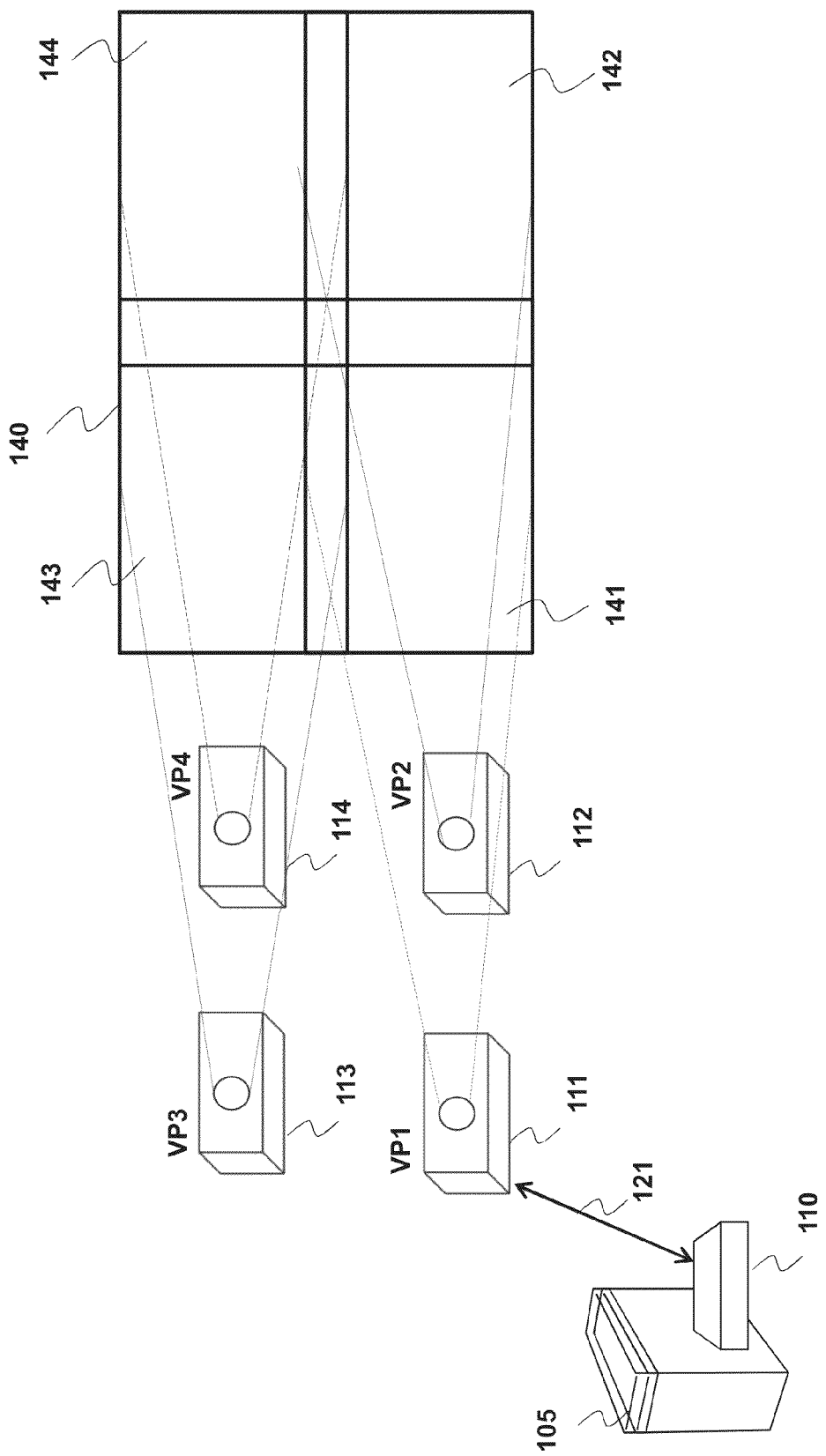
FIG. 1 represents a MP system for displaying video according to an embodiment of the invention.

FIG. 1 shows an example of a MP system according to an example embodiment of the invention, composed of four VPs, 111, 112, 113 and 114 which are preferably identical regarding the hardware architecture. When the optical zoom lens of each VP is adjusted to a given focal length, each of these VPs illuminates a quadrilateral area, respectively 141, 142, 143 and 144 to form an entire image 140, also called composite image, to be displayed. The four areas are arranged in two horizontal rows and two vertical columns and their border zones overlap. In a more general case, the number of VPs in the system can be less or more than four and the number of horizontal and vertical columns can be less or more than two. Preferably, the VP's are arranged in a regular grid.

A video source device 105 generates the whole video source data to be displayed by the MP system. The video source device 105 may be a digital video camera, a hard-disk or solid-state drive, a digital video recorder, a personal computer, a set-top box, a video game console or similar. The video source device 105 is connected to or embeds control device 110 which is responsible for splitting the whole video image generated by the video source device 105 into sub-images 141, 142, 143 and 144, applying blending process to the split sub-images, and transmitting them to at least one predefined VP. The control device 110 may be connected to a digital camera device (not represented) to capture the whole display with the four sub-images 141, 142, 143 and 144 for blending processing. Here, the predefined VP receiving all sub-images is VP 111, called the master VP, through a link 121 between the master VP 111 and the control device. The link can be wired or wireless. The master VP 111 distributes the sub-images to others VP through wireless communication links described with respect to the following figures.

Figure 2:
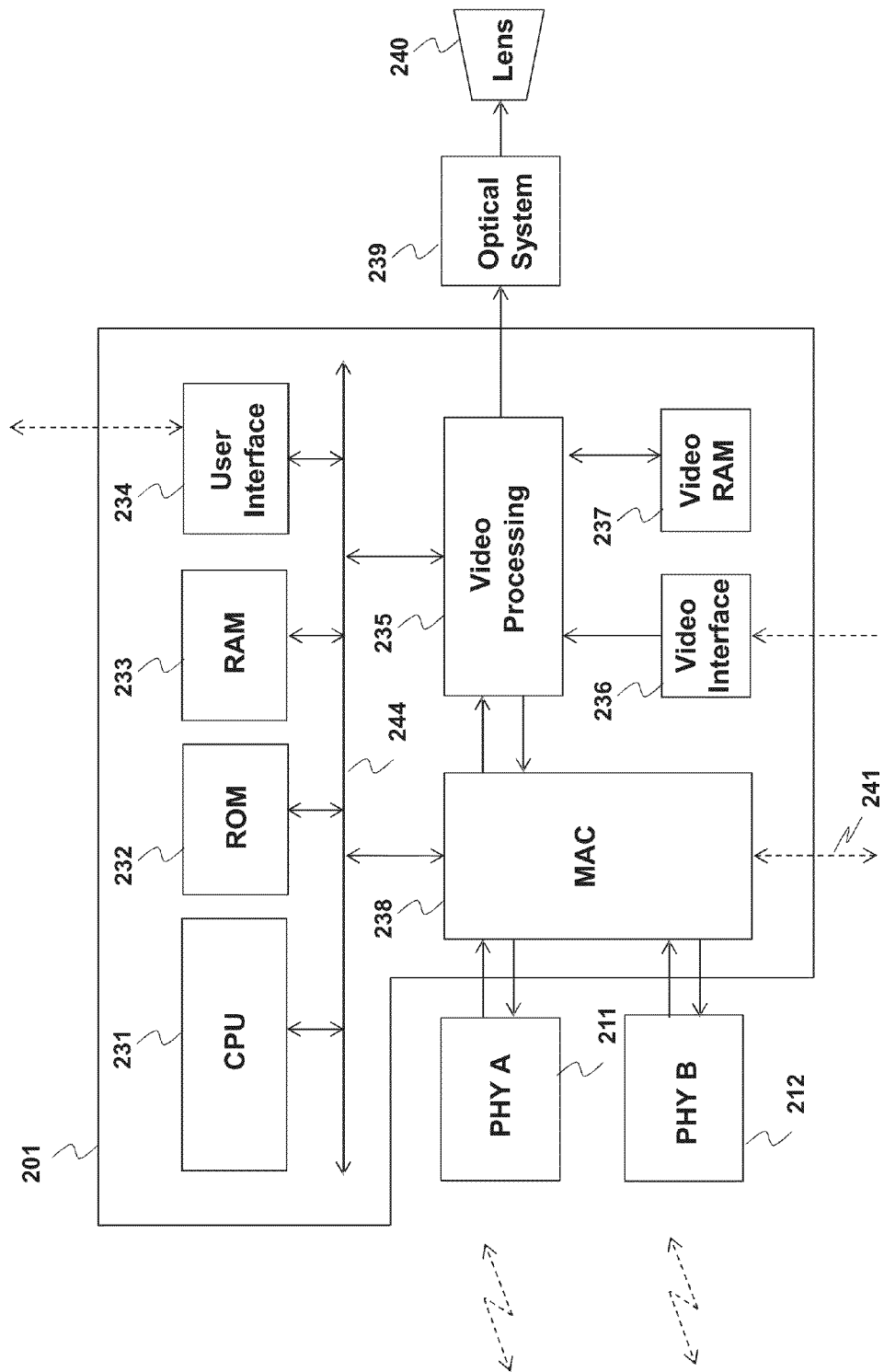
FIG. 2 is a functional block diagram of a video projector according to an embodiment the invention.

FIG. 2 shows the functional block diagram of any VP represented in FIG. 1. A VP comprises:
a main controller 201,
two physical layer units (denoted PHY A and PHY B) 211 and 212,
an optical system 239 including a projection lamp,
a projection lens 240.
The main controller 201 is itself composed of:
a Random Access Memory (denoted RAM) 233,
a Read-Only Memory (denoted ROM) 232,
a micro-controller or Central Processing Unit (denoted CPU) 231,
a user interface controller 234,
a medium access controller (denoted MAC) 238,
a video processing controller 235,
a video interface controller 236,
a video Random Access Memory (denoted video RAM) 237.

CPU 231, MAC 238, video processing controller 235, user interface controller 234 exchange control information via a communication bus 244, on which is also connected RAM 233, and ROM 232. CPU 231 controls the overall operation of the VP as it is capable of executing, from the memory RAM 233, instructions pertaining to a computer program, once these instructions have been loaded from the memory ROM 232.

Thanks to the user interface controller 234, the installer of the MP system can configure each VP. This interface can be a wired interface (like Ethernet, Universal Serial Bus USB) or a wireless interface (like infrared, WiFi). Through this interface, the installer can define the MP system configuration (number of VP per rows and columns) and it can assign the role of each VP (master/non master VP, image sub-part to display). The user's settings are stored in RAM memory 233.

The video processing controller 235 performs all necessary transformations of video data which are temporary stored in video RAM 237. The operations performed by video processing controller 235 depend on the role of the VP. For a master VP connected to the source device 105 by wire, all video image sub-parts are received by the video processing controller 235 through the video interface controller 236. For instance, it can be a HDMI receiver or a DisplayPort receiver. For a master VP wirelessly connected to the video source device 105, the video processing controller 235 receives all video image sub-parts from the MAC 238. For non-master VPs, video image sub-parts to display locally or to forward to another VP are received from the MAC 238. For any VP, video processing controller 235 has to deliver the image sub-part to the optical system 239 in synchronization with all other VPs. Prior to this transfer, video processing controller 235 may have to apply some digital adaptation like a digital zoom, or an upscale to a higher video resolution. The optical system 239 will typically operate in the analogue domain, and will transmit the analogue signal to the projection lens 240. Also, video processing controller 235 has to transmit the image sub-parts to be forwarded to other VPs. This forwarding operation is controlled by MAC 238 that will request new data to video processing controller 235 at transmission times on the wireless medium.

MAC 238 controls the emission and reception of MAC frames conveying control data and video data. For data communications between VPs, the MAC 238 can use two physical layer units 211 and 212. In case of a master VP wirelessly connected to the video source device 105, then MAC 238 is connected to additional physical layer units (not represented on the FIG. 2) and accessible through the specific interface 241. Preferably, all the physical layer units are operating in the 60 GHz band. Useful throughput between MAC 238 and each physical layer unit is in the order of 3.5 Gbps.

Each physical layer unit 211 and 212 comprises a modem, a radio module and antennas. The radio module is responsible for processing a signal output by the modem before it is sent out by means of the antenna. For example, the processing can be done by frequency transposition and power amplification processes. Conversely, the radio module is also responsible for processing a signal received by the antenna before it is provided to the modem. The modem is responsible for modulating and demodulating the digital data exchanged with the radio module. For instance, the modulation and demodulation scheme applied is of Orthogonal Frequency-Division Multiplexing (OFDM) type. In the preferred embodiment, antennas are quasi omni-directional antenna with static radiation pattern but the invention is not limited to this type of antenna. Smart antennas with configurable directional radiation pattern could be used instead, the antennas being steerable to a given direction. Typically, each physical layer unit embeds antenna for transmission and antenna for reception.

MAC 238 acts as a synchronization control unit, which controls scheduling of transmissions via the network. It means that MAC 238 schedules the beginning and the end of an emission of radio frames over the medium, as well as the beginning and the end of a reception of frames from the medium. In the preferred embodiment, access to the medium is scheduled according to a TDMA (Time Division Multiple Access) scheme, where each transmission time slot is associated to only one VP. A single MAC frame is transmitted during each transmission slot. The set of MAC frames transmitted during one TDMA sequence is called a superframe. Typically, superframe duration is 20 ms and time slot duration is in the order of 200 μs.

Among VPs, one is in charge of defining the beginning of each superframe cycle. For instance it can be the master VP 111 transmitting a first MAC frame at fixed periodic interval. This MAC frame is generally called a beacon frame marking the beginning of the superframe. Then, others VPs can determine the beginning of each superframe cycle according to the reception time of the beacon frame from the master VP.

To synchronize video image display between each VP, a timestamping technique can be used. In the beacon frame transmitted at the beginning of each superframe cycle, the master VP 111 inserts its local time value. Therefore a VP receiving the beacon frame can adjust its local time in phase with the master VP 111. Every non master VP can also forward beacon information to other VPs. Then each MAC frame conveying video data corresponding to the beginning of new video image, will include a timestamp value indicating at what time shall be displayed this new video image. Each non master VP will store image sub-part data it has to display until their local time reaches the timestamp value associated to the image sub-part.

Figure 3C:
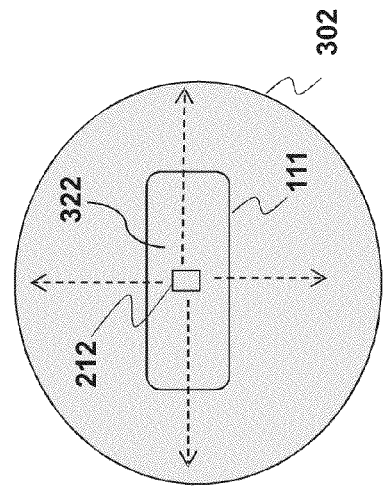
FIG. 3c is a side view of the projector of FIG. 3a representing the radiation pattern of one antenna.
Figure 3B:
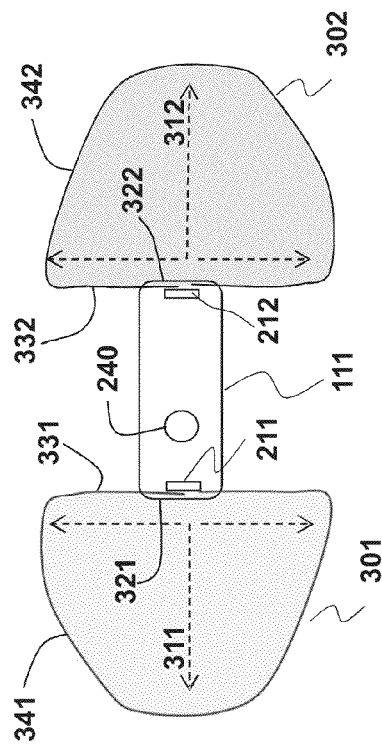
FIG. 3b is a front view of the projector of FIG. 3a representing the radiation patterns of antennas.
Figure 3A:
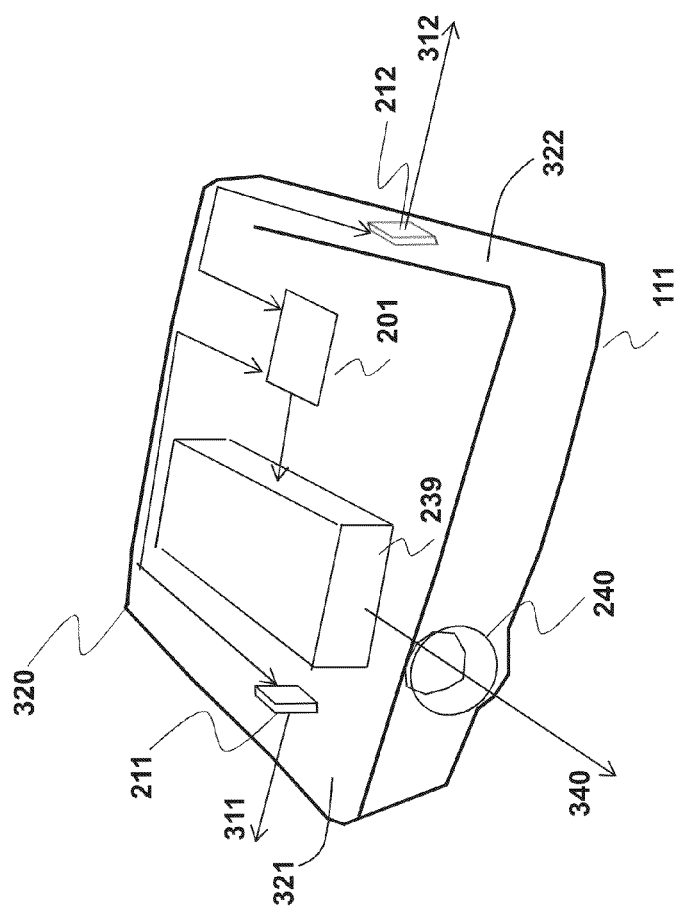
FIG. 3a shows an example of hardware architecture of a video projector according to an embodiment of the invention.

FIG. 3a shows an example of hardware architecture of a video projector according to an embodiment of the invention. This architecture is identical for VPs 111, 112, 113 and 114. Inside the casing 320 are represented the main elements of FIG. 2: the main controller 201, the optical system 239 having a projection axis 340, the projection lens 240 and the two physical layer units 211 and 212. Each physical layer units embeds independent antennas. Due to the strong attenuation of 60 GHz millimeter wave signals crossing materials, it is necessary to locate the antennas close to the casing of the VP, in a place free from obstacle (e-g metallic parts) for the radio waves at the frequency of operation. The antennas are located close to the edge of the VP casing. Ideally they are placed on two opposite sides of the VP casing: top/bottom sides, or right/left sides 322/321 as in the example of FIG. 3a. This arrangement will enable communications with others VPs and it will help to avoid interference between antenna from PHY A 211 and PHY B 212. Front/rear sides of the casing may not be convenient for locating antennas in a MP system where video projectors are arranged in a regular grid in square or rectangular manner. As shown in FIG. 3a, the optical system 239 acts as a shield isolating both PHY units electromagnetically from each other and thus avoiding interference. Alternatively or additionally, a dedicated shielding material can be installed inside the casing. The shield can be located between the PHY units or between the antennas. The shield can be disposed adjacent to each antenna. The shielding may contain electro-magnetic reflecting and/or absorbing materials. For signals such as 60 GHz, such material would include metal or carbon preferably in sheet or foam form.

FIG. 3b is a front view of a projector showing the radiation patterns of the antennas. The projector 111 has two physical layer units 211 and 212, which antennas are located near respective opposite sides 321 and 322. The radiation pattern obtained with the antennas of physical layer unit 211 and 212 are respectively represented by the shapes 301 and 302. The antennas radiate in the lateral directions outwardly from the casing on respective sides about central beam axes 311 and 312. The antennas are arranged with their central beam axis anti-parallel, that is having substantially the same directions but opposite magnitudes. The antennas radiate substantially symmetrically about the central beam axis, resulting in a substantially hemi-spherical or hemi-elliptical radiation pattern. The antennas radiate essentially from the casing sides 321,322 in the direction of the central beams axes 311,312 and also up and down at a base 331,332 of the hemi-shaped pattern. The base of the pattern is substantially planar while its body has substantially an elliptical shape 341,342 so that the radiation pattern shape is close to hemi-elliptic. Each antenna can thus reach antennas from other VP situated on the grid of VP even if the VPs are not perfectly aligned on the grid. The radiations patterns are preferably symmetrical on both sides of the projector 111. The central beam axes 311,312 are arranged to be perpendicular to the projection direction 340.

FIG. 3c is a side view of the projector showing the radiation pattern 302 of one antenna belonging to the physical layer unit 212. From the point of view of FIG. 3c, the radiation shape is omni directional and centered about the central beam axis 312.

Figure 4:
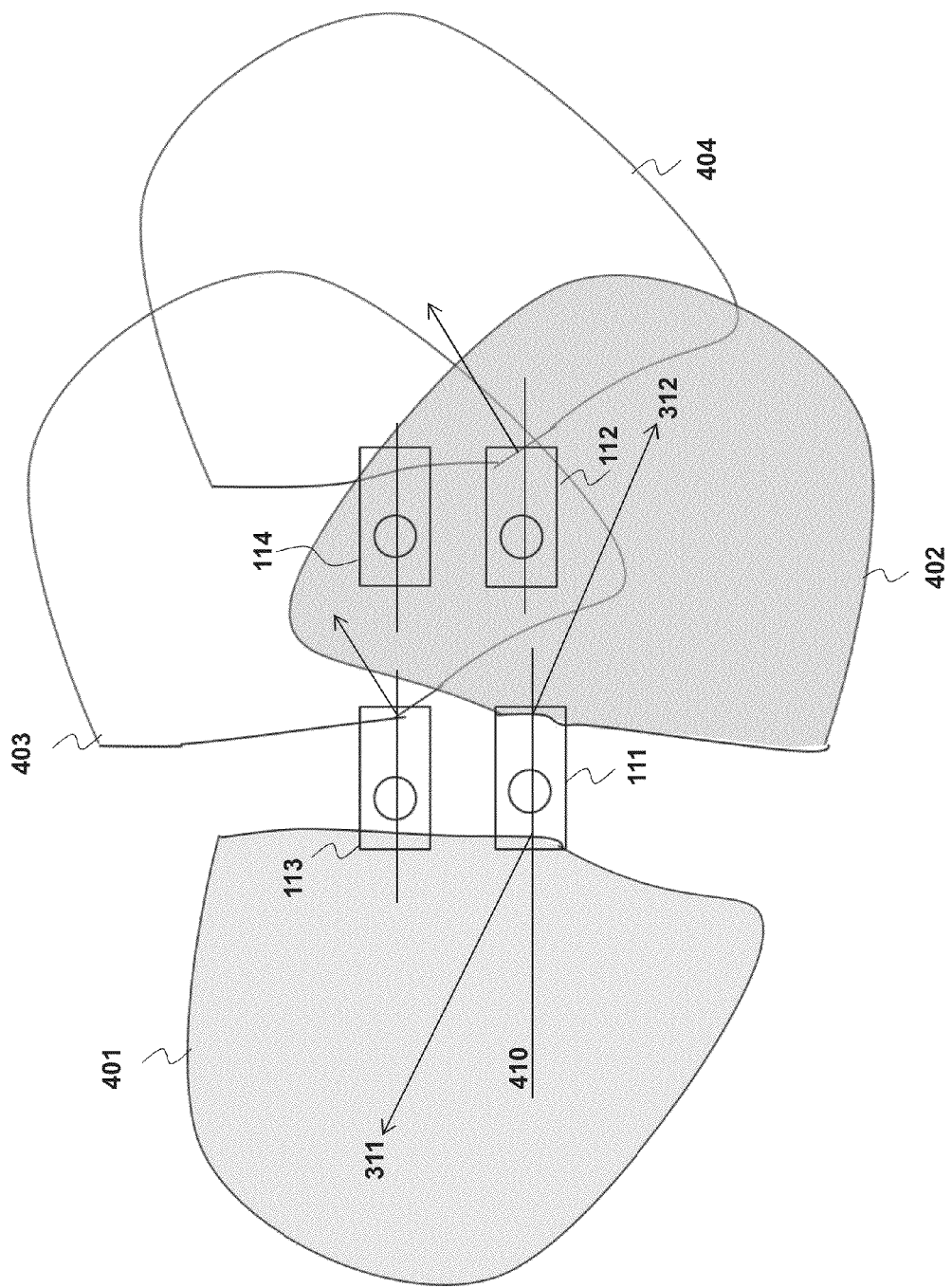
FIG. 4 shows an example of radiation patterns obtained when video projectors activate their wireless transmission means for video data transmission.

FIG. 4 shows an example of radiation patterns obtained when VPs 111, 112 and 113 activate their 60 GHz transmission means for video data transmission. The radiation pattern 401 is obtained when VP 111 is transmitting through its physical layer unit 211. It enables communication with VP 113 receiving millimeter wave signals through its corresponding physical layer unit 211. The radiation pattern 402 is obtained when VP 111 is transmitting through its physical layer unit 212. It enables communication with VP 112 receiving through its physical layer unit 211. It also enables communication with VP 114 receiving through its physical layer unit 211. In the same way, the radiation pattern 403 is obtained when VP 113 is transmitting through its physical layer unit 212, enabling communications with VPs 112 and 114. The radiation pattern 404 is obtained when VP 112 is transmitting through its physical layer unit 212, enabling communications with VP 114.

In the present embodiment one can observe that the central beam axes 311 and 312 are inclined with respect to horizontal line 410 when the VP is in use. Horizontal line is taken as a reference for the VP but any given direction of the VP could serve as reference line provided the reference line is taken in the plane containing the VP grid: for example a line joining the two physical layer units/antennas or a line crossing the two opposite sides of the casing would constitute suitable references lines. For VP 111, the central beam axes 311 is inclined above horizontal line 410 enabling VP 111 to communicate with the physical layer unit 211 of VP 113. The central beam axes 312 is inclined below horizontal line 410 enabling VP 111 to communicate with the physical layer unit 211 of VP 112 and 214 without interfering with VP 113.

Figure 5:
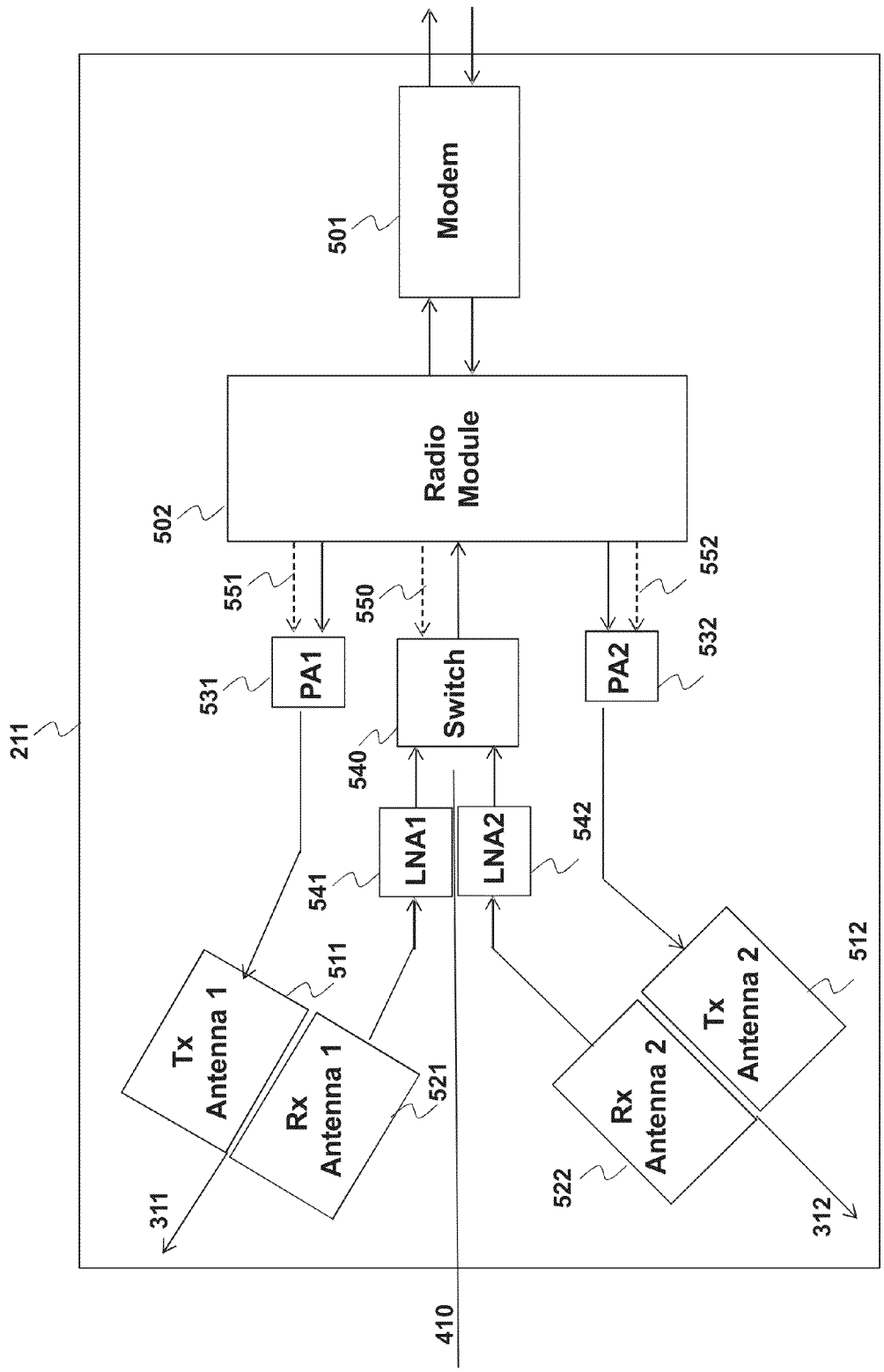
FIG. 5 shows an example of the functional block diagram of a physical layer unit.

FIG. 5 shows an example of the functional block diagram of a physical layer unit like 211. As mentioned in the description of FIG. 2, it embeds a modem 501, a radio module 502, and in this particular example, two transmitting antenna 511 and 512 located at side 321 and arranged close to each other. The antennas produce identical radiation patterns but with different directions 311,312 with respect to a horizontal reference direction 410. The physical layer also embed two receiving antenna 521 and 522 arranged in the same way and adjacent to antennas 511 and 512. The inclination angle between the beam axis of the antennas and the reference direction may be adapted according to the system configuration (distance between VP, relative position of the VP). Angles comprised between 30° aid 60° would be well suited values. The inclination of the beam axis of the antennas 511 and 521 is opposite to the inclination of the beam axis of the antennas 512 and 522 with respect to the reference direction.

The radio module is mainly in charge of up-converting and down-converting signals frequency. For transmission, it provides up-conversion from the low frequency of the modem to the high frequency (e.g. 60 GHz) of radio signals. For reception, it provides the reverse operation (down-conversion from high to low frequency). Inside radio module, both transmitting antenna 511,512 are fed from the same source signal through a power splitter (not represented). After the power splitter, a power amplifier is placed before each antenna: power amplifier 531 for antenna 511 and power amplifier 532 for antenna 512. An on/off command constitutes a switching means on the power amplifier which enables to activate/ disable the transmission on each antenna. The switching means enable to switch from one antenna to the other and thus to select the inclination angle of the beam axes. Command signal for antenna 511 is represented by the arrow 541; it is driven by the CPU 231 through the MAC 238 and the modem 501. Similarly the arrow 542 is the command signal for the antenna 512. The radiation patterns described in FIG. 4 can be obtained with this circuit. For instance, the radiation pattern 401 is obtained by activating transmission antenna 511 of physical layer unit 211 and by disabling all others transmission antennas. Also, a switch 540 controlled by the signal 550 from CPU 231 enables to select receiving antenna 521 or receiving antenna 522. Before going through the switch 540, the radio signals are amplified by a low noise amplifier (LNA) referred 541 for the signal received on antenna 521, and referred 542 for the signal received on antenna 522.

In another embodiment, one may use a single omni-directional transmitting antenna and a single omni-directional receiving antenna (as in FIG. 3). In still another embodiment, one may use smart antennas with configurable directional radiation pattern, the antennas being steerable such that the central beam axis can be oriented to be inclined with respect to the reference direction of the VP.

Figure 6:
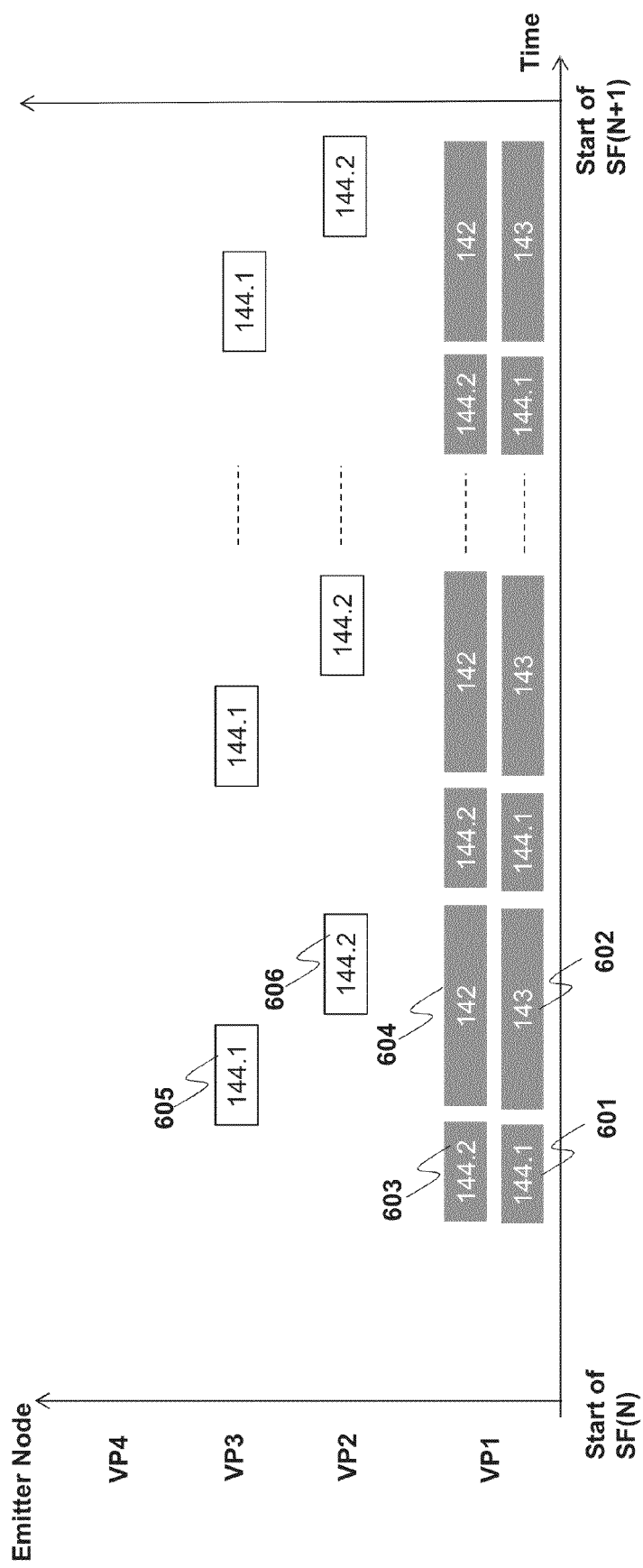
FIG. 6 shows an example of the TDMA sequence for video data transmission.

FIG. 6 shows an example of the TDMA sequence for video data transmission corresponding to the example of FIG. 4. This figure represents one superframe timeline (superframe cycle N), with all MAC frames transmitted by VPs 111, 112, 113, 114 (respectively VP1, VP2, VP3, VP4). For instance, duration of superframe cycle is around 20 ms while duration of MAC frame like 602 is around 200 μs and duration of MAC frame like 601 is around 100 μs. The master VP 111 transmits MAC frames like 602 conveying video data of image sub-parts 143. This transmission is performed with the physical layer unit PHY A 211 and its antenna 511, using a first 60 GHz radio channel. These MAC frames are received by VP 113 through its physical layer unit PHY A 211 and its antenna 522. Such MAC frame is repeated 64 times (for example) within one superframe. Also the master VP 111 transmits MAC frames like 601 conveying video data of first half of image sub-part 144. These transmissions are performed prior to MAC frames 602 with the same radio configuration. These MAC frames are also received by VP 113, and they are also repeated 64 times (for example) within one superframe.

In the same way the master VP 111 transmits MAC frames like 604 conveying video data of image sub-part 142. This transmission is performed with its physical layer unit PHY B 212 and its antenna 512, using the first 60 GHz radio channel. These MAC frames are received by VP 112 through its physical layer unit PHY A 211 and its antenna 521. Such MAC frame is repeated 64 times (for example) within one superframe. Also the master VP 111 transmits MAC frames like 603 conveying video data of second half of image sub-part 144. These transmissions are performed prior to MAC frames 602 with the same radio configuration. These MAC frames are also received by VP 112, and they are also repeated 64 times (for example) within one superframe.

Still in FIG. 6, it is shown that VP 113 relays first half of image sub-part 144 through MAC frames like 605 (forwarding of MAC frames like 603), and VP 112 relays second half of image sub-part 144 through MAC frames like 606 (forwarding of MAC frames like 601). For transmissions, VP 113 and VP 112 use their physical layer unit PHY B 212 with antenna 511. VP 114 selects its physical layer unit PHY A 211 for reception of MAC frames from VP 113, and selects its physical layer unit PHY B 212 for reception of MAC frames from VP 112. Transmission of MAC frames from VP 113 or VP 112 are concurrent with transmission of MAC frames from VP1 111. To avoid radio interference, VP 112 and VP 113 selects a radio channel different from the radio channel used by VP 111. VP 112 and VP 113 can select the same radio channel as their transmission time slots are not concurrent. After reception of MAC frames from VP 112 and VP 113, the video projector VP 114 can reassemble the image sub-part 144 to display.

Figure 7:
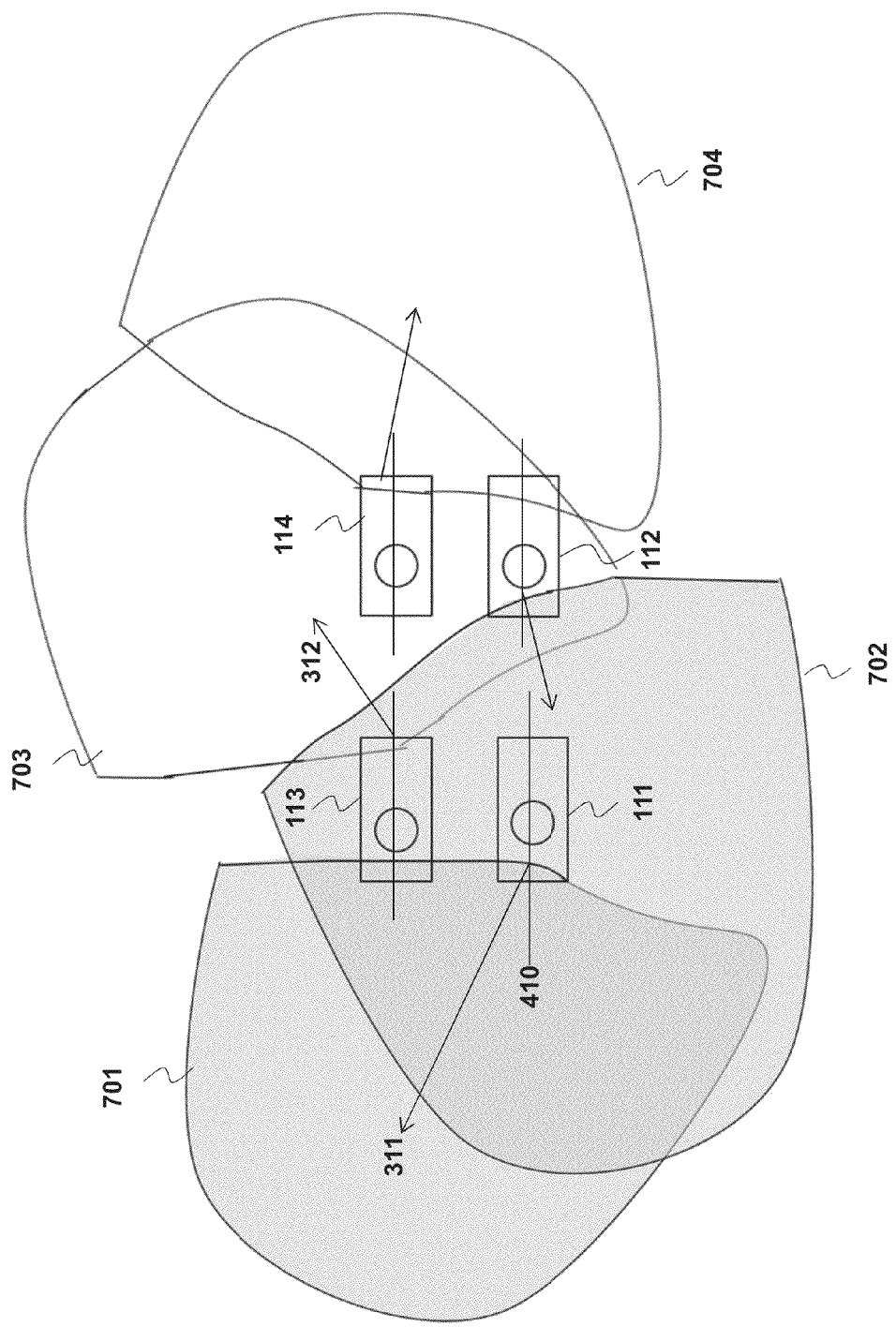
FIG. 7 shows an example of radiation patterns obtained when video projectors activate their wireless transmission means for control data transmission.

FIG. 7 shows an example of radiation patterns obtained when VPs 111, 112 and 113 activate their transmission means for transmission of control data. The radiation pattern 701 is obtained when VP 111 is transmitting through its physical layer unit 211. It enables communication with VP 113 receiving millimeter wave signals through its physical layer unit 211. The radiation pattern 703 is obtained when VP 113 is transmitting through its physical layer unit 212. It enables communication with VP 114 receiving through its physical layer unit 211. It also enables communication with VP 112 receiving through its physical layer unit 211. In the same way, the radiation pattern 704 is obtained when VP 114 is transmitting through its physical layer unit 212, enabling communications with VP 112. The radiation pattern 702 is obtained when VP 112 is transmitting through its physical layer unit 212, enabling communications with VP 111 and VP 113. Similarly to FIG. 4, one can observe that the central beam axes 311 and 312 are inclined with respect to horizontal line 410 when the VP is in use. For VP 111, the central beam axis 311 is inclined above horizontal line 410 while for VP 112 the central beam axes 311 is inclined below horizontal line, for VP 113 the central beam axis 312 is inclined above horizontal line and for VP 114 the central beam axis 312 is inclined below horizontal line.

Figure 8:
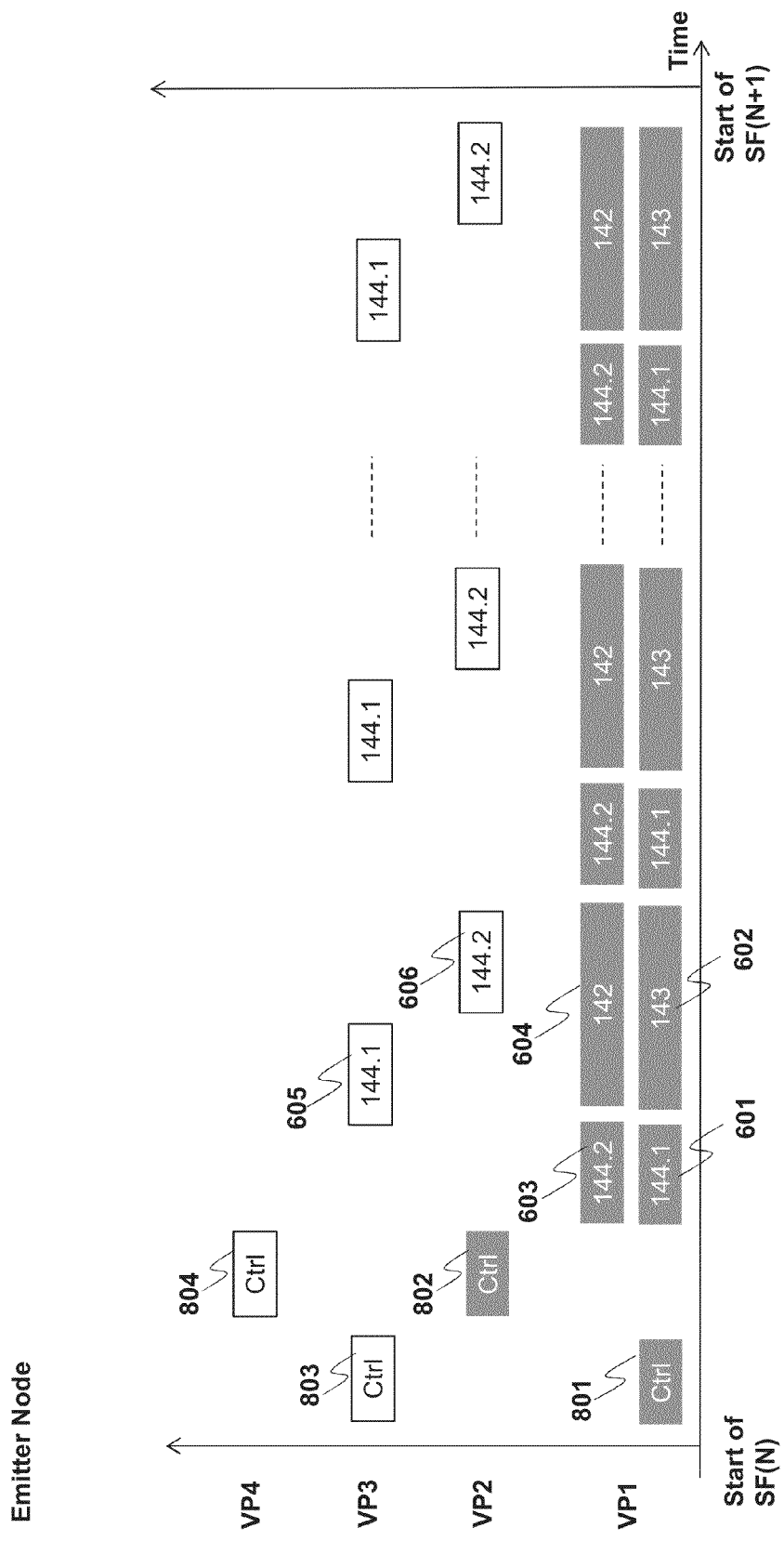
FIG. 8 shows an example of the TDMA sequence for control data transmission in addition to video data transmission.

FIG. 8 shows an example of the TDMA sequence for control data transmission in addition to video data transmission corresponding to the example of FIGS. 4, 6 and 7. This figure includes the MAC frames for video transmission like 601, 602, 603, 604, 605, 606 described in FIG. 6. In addition, very short MAC frames 801 to 804 (in the order of 10 μs duration) convey control data transmitted by each VP.

Master VP 111 transmits MAC frame 801 including control information like the current local time in master VP and like the TDMA sequence description to be followed by each VP. This transmission is performed with its physical layer unit PHY A 211 and its antenna 511, using a first 60 GHz radio channel. This MAC frame is received by VP 113 through its physical layer unit PHY A 211 and its antenna 522. At the same time (in this example), VP 113 transmits MAC frame 803 including its own control information and relaying control information form master VP received during the previous superframe. This transmission is performed with its physical layer unit PHY B 212 and its antenna 511, using a second 60 GHz radio channel. This MAC frame is received by VP 114 through its physical layer unit PHY A 211 and its antenna 521.

In the same way, VP 114 transmits MAC frame 804 including its own control information and relaying control information form master VP 111 and VP 113 received during the previous superframe (through VP 113). This transmission is performed with its physical layer unit PHY B 212 and its antenna 512, using the second 60 GHz radio channel. This MAC frame is received by VP 112 through its physical layer unit PHY B 212 and its antenna 521. At the same time (in this example), VP 112 transmits MAC frame 802 including its own control information and relaying control information form master VP 111, VP 113 and VP 114 received during the previous superframe (through VP 114). This transmission is performed with its physical layer unit PHY A 211 and its antenna 512, using the first 60 GHz radio channel. This MAC frame is received by master VP 111 through its physical layer unit PHY B 212 and its antenna 522.

Figure 9:
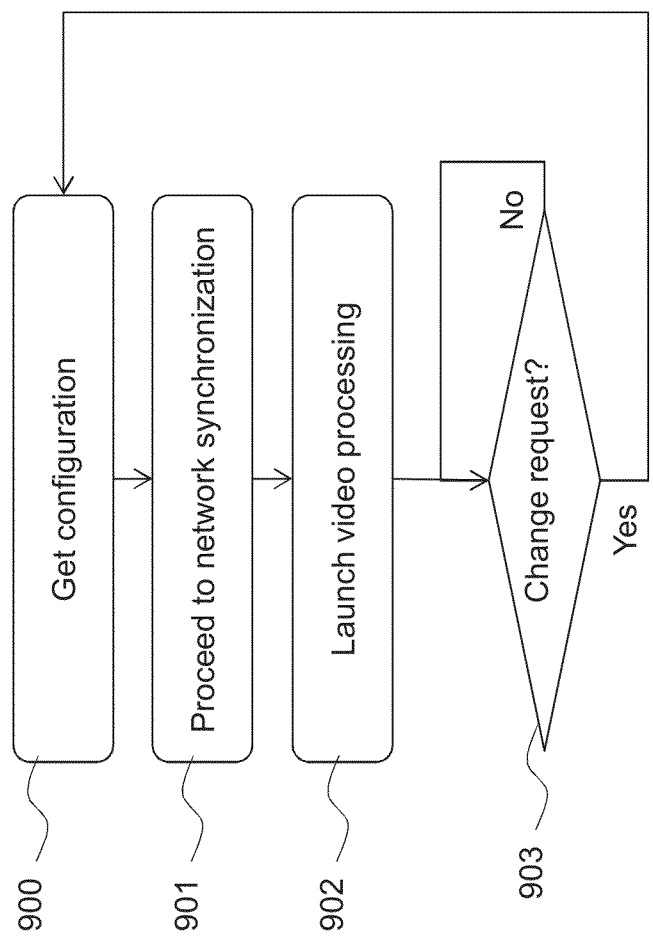
FIG. 9 is a flow chart of the algorithm executed at the initialization of a video projector.

FIG. 9 is a flow chart of the algorithm executed by CPU 231 at the initialization of a video projector.

In step 900, the CPU 231 is receiving a new configuration from the user interface 234. This configuration includes the description of the MP system to setup and the role of the video projector in this MP system (image data sub-part to display or to forward).

In step 901, the CPU 231 proceeds to the wireless network synchronization. For the master VP 111, it consists in starting emitting a beacon frame at the beginning of each superframe cycle (on a first radio channel), and then waiting for the reception of MAC frame from a non-master VP. The beacon information includes the local time in master VP 111 at the beginning of the superframe cycle, the duration of time slots in the TDMA sequence, the allocation of time slots to each VP. In the example of FIG. 1, the master VP 111 is on the left bottom corner of the MP system, therefore the master VP transmits beacon frame as described in FIGS. 7 and 8. In the same way it waits from reception of MAC frame from VP 112 as described in the same figures. For a non-master VP, the network synchronization consists in waiting for the reception of MAC frame including beacon information (directly from the master VP or indirectly relayed by a non-master VP) in order to adjust local time. Once this is done, a non-master VP can transmit its own MAC frame during the time slot allocated by the master VP 111. When transmitting a MAC frame with control information, a VP can confirm its current synchronization status. It can also relay similar information received from other VPs In case of failure to synchronize after a predefined time, a non-master VP may decide to change the radio channel used to receive MAC frames.

When the master VP detects that all VPs are synchronized, it can move to the step 902 launching the video data transmission. It first checks if video data are received from the video source 105. In the presence of video data, CPU 231 updates the beacon information to transmit indicating that video transmission is active.

In step 903, CPU 231 checks for detection of configuration change received from the user interface 234. If change is confirmed, CPU 231 updates beacon information to notify the other VPs the deactivation of video transmission and it returns to step 900 for initialization.

Figure 10:
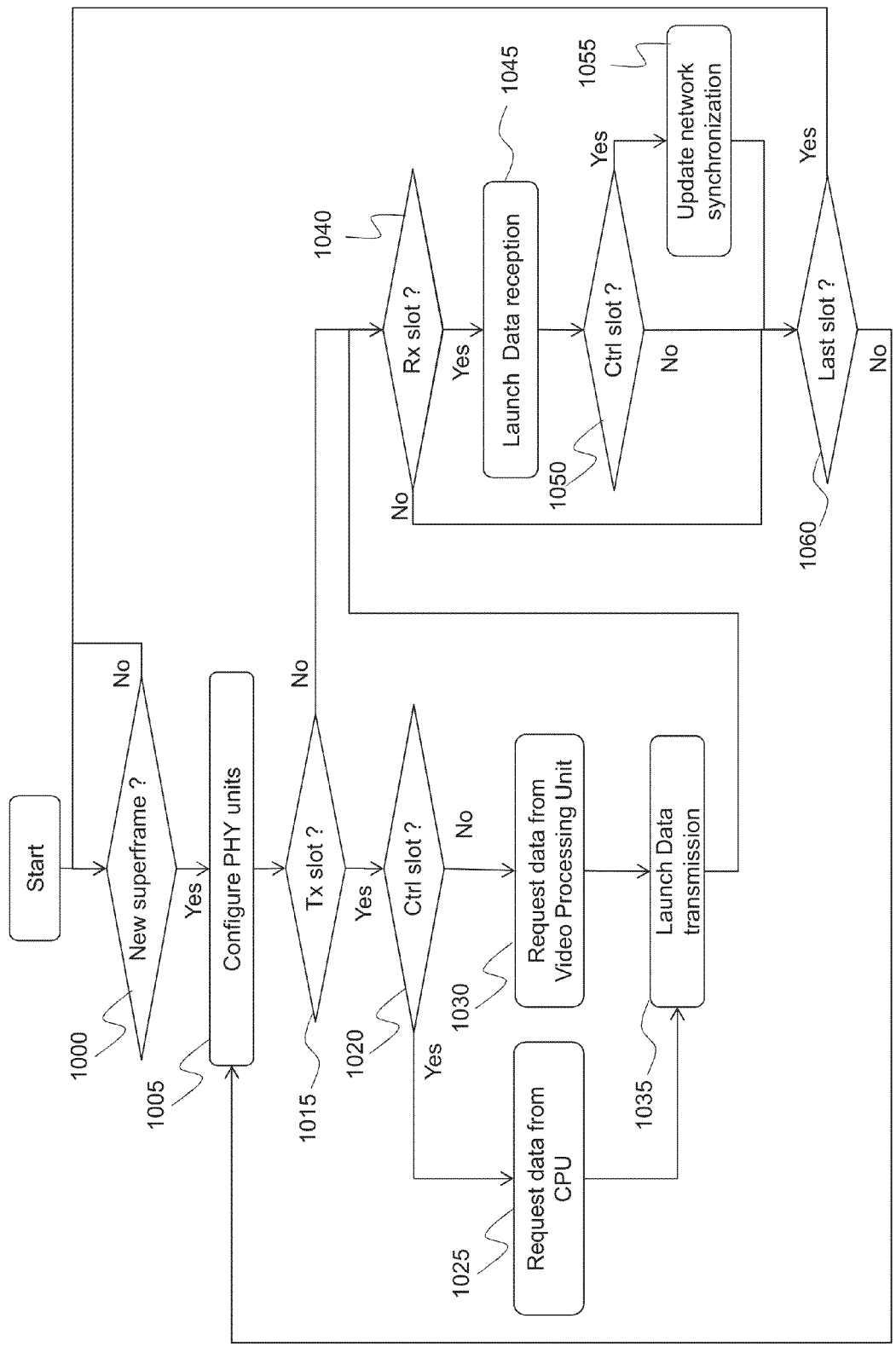
FIG. 10 is a flow chart of the algorithm executed by MAC 238 for transmission and reception of MAC frames.

FIG. 10 is a flow chart of the algorithm executed by MAC 238 for transmission and reception of MAC frames. MAC 238 is configured by CPU 231 after initialization (step 900), after network synchronization (step 901) or after change request detection (step 903).

In step 1000, MAC 238 checks for the beginning of a new superframe. For a non-master VP not yet synchronized, a superframe cycle start is generated to enable the reception of a first MAC frame for synchronization. Otherwise the VP waits for the start of new superframe cycle indicated by its local time (the duration of a superframe cycle is fixed and predefined).

In step 1005 the MAC 238 transmits settings to the physical layer units to configure them to perform the desired operation during the next time slot in the superframe (enable/disable, transmission/reception, selection of antenna, selection of radio channel). After the test of step 1015, in case of transmission slot, the MAC 238 checks if the slot is for control data transmission. If yes, then in step 1025, MAC 238 requests control data to transmit. It means that MAC 238 gets control data stored by CPU 238 in RAM 233. Then MAC 238 triggers the emission of preamble in the selected physical layer unit and forwards these control data to the selected physical layer unit. These latter operations are performed at step 1035.

After the test of step 1020, in case of video data to transmit, MAC 238 requests video data to the video processing unit 235 in step 1030. The identification of image sub-part concerned and the amount of data to be transmitted during the time slot are included in the request. In response, the video processing unit 235 delivers data that are forwarded to the selected physical layer unit by MAC 238 (step 1035). For a master VP that simultaneously transmits on both physical layer units, two requests shall be transmitted to the video processing unit 235 and two concurrent transmissions will occur.

During data transmission, MAC 238 can insert CRC (Cyclic Redundancy Check) at regular period delimiting blocks of data. This will be used at reception side to detect transmission errors at the granularity of block of data.

After launching a transmission, MAC 238 checks if the time slot is also a reception slot by moving to step 1040. Step 1040 is also executed in case of negative answer to the step 1015 (check for transmission slot). If a reception is not planned (check 1040 negative), it is checked at step 1060 if the time slot is the last time slot of the superframe. If not, the MAC 238 waits for the beginning of next time slot and goes back to step 1005 to configure the physical layer units according to the TDMA sequence description. In case of last time slot (check 1060 positive) the MAC 238 returns to step 1000 waiting for the next superframe cycle start.

In case the time slot is a reception slot (positive check at step 1040), the MAC 238 launches the data reception at step 1045. For control data, MAC 238 writes received data to RAM 233 (and notifies CPU 231), while for video data, MAC 238 sends received data to the video processing unit 235. During reception MAC 238 can check CRC on each block of data. In case of errors on control data, MAC 238 notifies CPU 231. In case of errors on video data, MAC 231 notifies the video processing unit 235. A notification is also sent in case of missing data due to the absence of correct signals at the input of physical layer units.

In case of reception time slot for control data, checked during step 1050 for a non-master VP, the MAC 238 updates the network synchronization status by adjusting its local time in order to keep in phase with the master VP.

Figure 11:
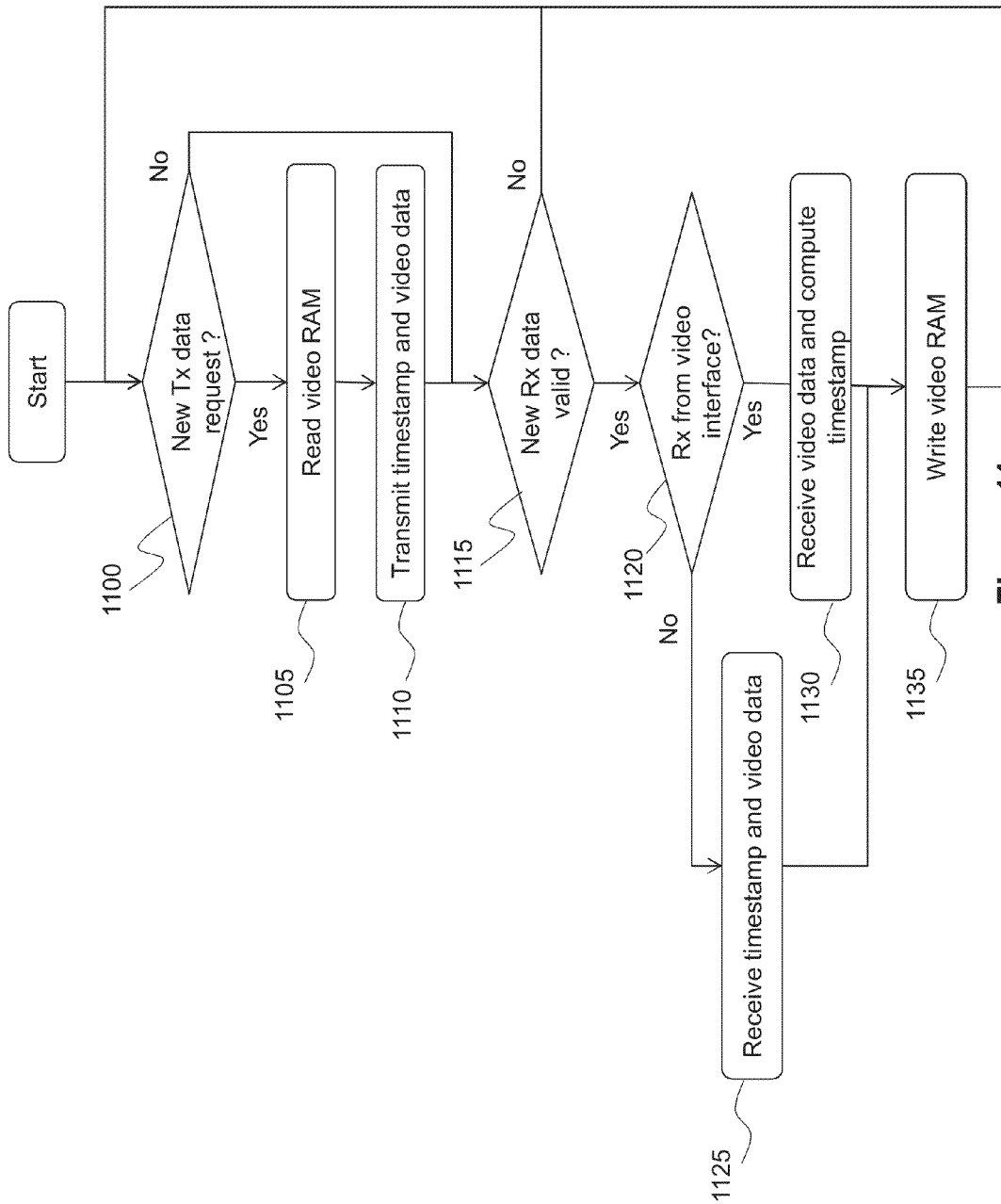
FIG. 11 is a flow chart of the algorithm executed by the video processing unit 235 to manage transmission and reception of video data.

FIG. 11 is a flow chart of the algorithm executed by the video processing unit 235 to manage transmission and reception of video data. Video processing unit 235 is configured by CPU 231 after initialization (step 900)

In step 1100 the video processing unit 235 checks if a transmission request is received from MAC 238. If yes, then in step 1105, the video processing unit 235 starts reading video RAM 233 according to the information contained in the request in particular the image data sub-part identification and the amount of data to transmit. For instance, video RAM 233 is divided into 4 zones, each zone being dedicated to one image sub-part. The fourth zone for image sub-part 144 is itself divided into 2 sub-zones for identifying the two halves of image sub-part 144. The video processing unit 235 also reads its internal registers to know where the current read pointer is positioned to access the desired video RAM zone. It also reads its internal registers indicating the position in video RAM 233 of the beginning of next image. This will allow video processing unit 235 to detect if the beginning of a new image will be transmitted within the MAC frame. If yes, then the video processing unit shall read timestamp value associated to this new image. In step 1110 the timestamp value is transmitted to the MAC together with the position of the start of new image in the MAC frame. These two pieces of information are transmitted to the destination VP at the beginning of the MAC frame. In case no new image is present, the timestamp field of the MAC frame is left empty. For transmission to the MAC 238, video data are read from video RAM 233 according to the current read pointer incremented after each word read.

After launching the transmission, the video processing unit 235 checks if valid data are received in step 1115. If not it returns to the step 1100 waiting for a new transmission request. If yes, the video processing unit 235 checks in step 1120 if video data are received from the wired video interface 236 or from the wireless interface through MAC 238. Reception from wired video interface 236 only concerns the master video projector 111 connected by wire to the video source control device 110. For reception from wireless interface, in step 1125, the video processing unit 235 receives the timestamp information and the position of new image data in the MAC frame prior to the video data. In case of non-empty value, the timestamp is stored in internal register together with the pointer value of video RAM 233 where the beginning of new image will be stored. In next step 1135, the video processing unit starts writing video data at the location indicated by the current write pointer (incremented at each word written in video RAM 233). At the beginning of the process, the VP waits for the reception of a first video image to store video data.

In case of missing or erroneous received data notified by the MAC 238, the video processing unit 235 may apply some concealment mechanism like replacing missing data by previous image data.

After launching the reception operation, the video processing unit returns to step 1100 checking for new transmission request.

In step 1120, in case of master VP 111 receiving video data from the video interface 236, the video processing unit 235 shall receive video data in step 1130 and it shall check for the beginning of a new video image. When it is the case, the video processing unit 235 computes the timestamp value corresponding to the time when the new image must be displayed. This timestamp corresponds to the local time plus a fixed predefined value covering the latency L for video transmission to all VPs within the MP system. Considering that the video source control device 110 delivers first image sub-parts 143 and 144 and then image sub-parts 141 and 142, the master VP 111 stores full image sub-parts 143 and 144 and starts wireless transmission after receiving first lines of image sub-parts 141 and 142. The timestamp value is computed when starting reception of image sub-part 143, and this timestamp value will be associated to each image sub-part (for synchronized display by all VPs). Considering frame rate of 60 frames per second (16.66 ms between two images), and according to the transmission scheme described in FIG. 8 (about 300 µs for wireless transmission), one can choose L=20 ms.

In case the master VP 111 wirelessly receives the video image sub-parts, above timestamp computation operation is computed by video source control device 110. The value L may thus be higher in order to take into account the latency for transmission from video source control device 110 to the master VP 111.

Figure 12:
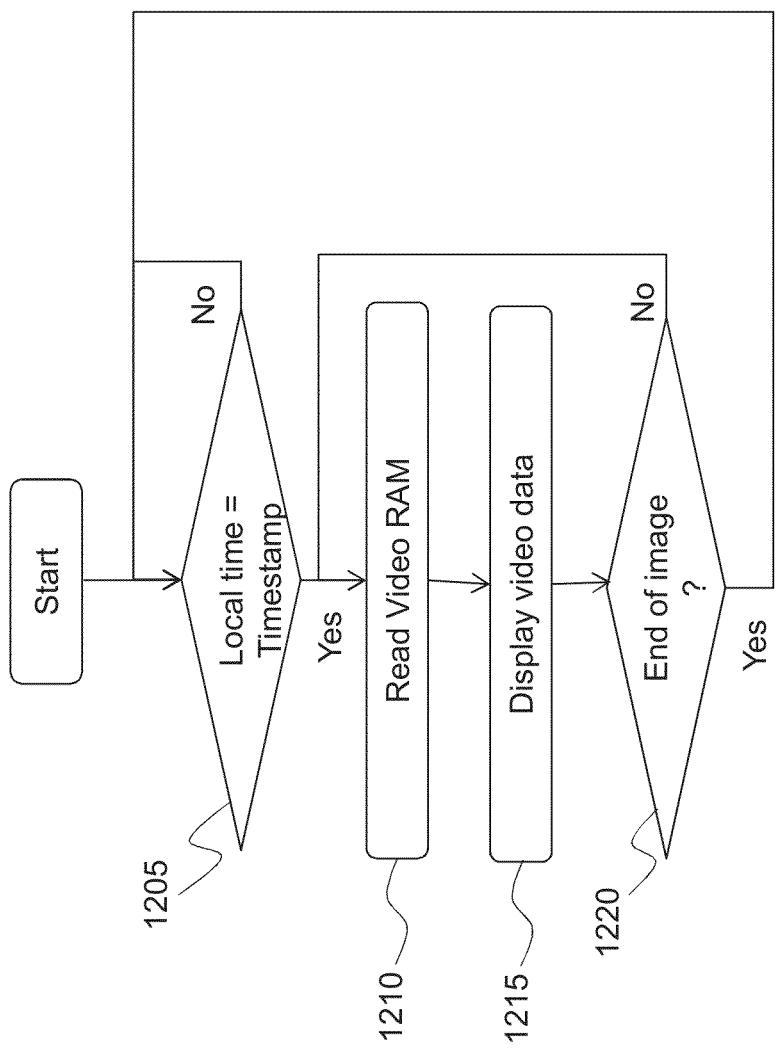
FIG. 12 is a flow chart of the algorithm executed by the video processing unit 235 to manage video image display.

FIG. 12 is a flow chart of the algorithm executed by the video processing unit 235 to manage video image display. When a VP has received video data and one timestamp value is stored in its internal register, the video processing unit 235 checks in step 1205 if the local time is equal to the timestamp value. When it is the case, the video processing unit 235 reads video RAM 233 at the location indicated by the read pointer stored with the timestamp value. This operation is done at step 1210 where one data word is read and the read pointer is incremented. In step 1215, video data is transmitted to the optical system 239. This is repeated until the end of the image, condition checked at step 1220. Then the video processing unit 235 can wait again in step 1205 until next timestamp value reaches by the local timer.

The invention claimed is:

1. A wireless transmission method for distributing image data within a cluster of video projectors, each video projector comprising first and second antennas, from a first video projector to other video projectors of the cluster, the method comprising:
dividing the image data into several image data sub-parts;
assigning each image data sub-part to a video projector in accordance with a composite image to be displayed by the cluster;
the method further comprising at the first video projector:
receiving image data sub-parts;
extracting and storing the image data sub-part assigned to the first video projector; and
retransmitting through the first and second antenna of the first video projector, image data sub-parts assigned to respectively second and third video projectors.

2. The method of claim 1, further comprising at a at the second video projector:
receiving through the first antenna the image data sub-parts transmitted by the first video projector;
extracting and storing the image data sub-part assigned to the respective video projector; and
retransmitting through the second antenna the image data sub-parts assigned to the third video projector.

3. The method of claim 2, wherein the second and third video projectors receive image data subparts through a first radio channel and retransmit image data subparts on a second radio channel different from the first channel.

4. The method of claim 2, further comprising assembling the received image data sub-parts at a fourth video projector.

5. The method of claim 1 further comprising, before the step of receiving image data sub-parts, exchanging through the antennas control data relative to the image data sub-parts to be received.

6. The method of claim 1, wherein the image data is transmitted within frames according to a Time Division Multiple Access (TDMA) sequence, the first video projector transmitting control data marking the beginning of the TDMA sequence, the other video projectors determining the beginning of each TDMA sequence according to the reception time of the frames.

7. The method of claim 6, wherein the first video projector marks the beginning of the TDMA sequence by transmitting the first frame at the beginning of the TDMA sequence.

8. The method of claim 1, wherein each video projector comprises a first antenna located at a first side of the projector and a second antenna located at a second side of the projector, opposite to the first side, wherein:
the first antenna is configured to form a first radiation pattern that extends outwardly from the first side,
the second antenna is configured to form a second radiation pattern that extends outwardly from the second side, and
wherein the first and second radiation patterns do not interfere.

9. A non-transitory computer-readable medium storing a program which, when executed by a microprocessor or computer in a video projector, causes the video projector to perform the method steps according to claim 1.

10. A video projector comprising a first antenna located at a first side of the projector and a second antenna located at a second side of the projector, opposite to the first side, wherein:
the first antenna is configured to form a first radiation pattern that extends outwardly from the first side,
the second antenna is configured to form a second radiation pattern that extends outwardly from the second side, and
wherein the first and second radiation pattern do not interfere,
wherein each antenna defines a central beam axis and is configured to form a substantially hemi-elliptical radiation pattern centered about this axis, and
wherein the central beam axes are arranged to be inclined with respect to a reference direction of the video projector when in use.

11. The video projector according to claim 10, wherein the first and second antennas are arranged with their central beam axes substantially anti-parallel.

12. The video projector according to claim 10, wherein the central beam axes are arranged to be substantially perpendicular to an optical axis of the projector.

13. The video projector according to claim 10, wherein the reference direction is a reference line joining the antennas and extending from the first side to the second side.

14. The video projector according to claim 10, further comprising a third antenna located at the first side adjacent to the first antenna and a fourth antenna located at the second side adjacent to the second antenna, each third and fourth antenna defining a central beam axis and being configured to form a substantially hemi-shaped radiation pattern centered about this axis, wherein the central beam axes of the third and fourth antennas are arranged to be inclined with respect to the reference direction of the video projector when in use.

15. The video projector according to claim 14, wherein the inclination of the beam axis of the third and fourth antennas is opposite to the inclination of the beam axis of the first and second antennas with respect to the reference direction.

16. The video projector according to claim 14, further comprising switching means enabling to switch from one antenna to another antenna for selecting the inclination of the beam axes.

17. The video projector according to claim 10, wherein the antennas are steerable in order to control the inclination of the central beam axes with respect to the reference direction.

18. The video projector according to claim 10, further comprising an electro-magnetic shield disposed inside the video projector such that the first and second radiation patterns do not interfere.

19. The video projector according to claim 18, wherein the shield is disposed between the antennas.

20. The video projector according to claim 19, wherein the shield is constituted by at least one component of the video projector.

21. A wireless cluster of video projectors for the transmission of image data from video projector to video projector, wherein each video projector of the cluster comprises a first antenna located at a first side of the projector and a second antenna located at a second side of the projector, opposite to the first side, wherein:
the first antenna is configured to form a first radiation pattern that extends outwardly from the second side,
the second antenna is configured to form a second radiation pattern that extends outwardly from the second side, and
wherein the first and second radiation patterns do not interfere,
the video projectors being arranged so that the first and second radiation pattern of a first video projector is configured to communicate with, respectively, at least one antenna of a second and one antenna of a third video projector.

22. The wireless cluster according to claim 21, wherein the video projectors are further arranged so that the radiation pattern of an antenna of the second video projector and the radiation pattern of an antenna of the third video projector reaches respectively first and second antennas of a fourth video projector.

23. The wireless cluster according to claim 21, wherein each antenna defines a central beam axis and is configured to form a substantially hemi-elliptical radiation pattern centered about this axis and wherein the video projectors are arranged on a grid and the central beam axes defined by the antennas are inclined relative to the grid.

\* \* \* \* \*